(12) United States Patent
Haddad et al.

(10) Patent No.: US 9,025,439 B2
(45) Date of Patent: May 5, 2015

(54) METHOD AND SYSTEM TO ENABLE RE-ROUTING FOR HOME NETWORKS UPON CONNECTIVITY FAILURE

(75) Inventors: Wassim Haddad, San Jose, CA (US); Joel Halpern, Leesburg, VA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 366 days.

(21) Appl. No.: 13/533,457

(22) Filed: Jun. 26, 2012

(65) Prior Publication Data

US 2013/0346788 A1    Dec. 26, 2013

(51) Int. Cl.
*H04L 12/703*    (2013.01)
*H04L 12/24*    (2006.01)

(52) U.S. Cl.
CPC ..................... *H04L 41/50* (2013.01)

(58) Field of Classification Search
CPC ..... H04L 45/28; H04L 41/0654; H04L 69/40; H04L 12/2422
USPC ......... 370/216, 217, 221, 225, 226, 227, 228, 370/241, 242, 244, 248; 455/403, 422.1, 455/445
See application file for complete search history.

(56) References Cited

U.S. PATENT DOCUMENTS

| | | | |
|---|---|---|---|
| 5,956,323 A | 9/1999 | Bowie | |
| 6,631,416 B2 | 10/2003 | Bendinelli et al. | |
| 7,675,923 B2 | 3/2010 | Rossi et al. | |
| 7,729,365 B2 | 6/2010 | Motegi et al. | |
| 7,801,039 B2 | 9/2010 | Monette et al. | |
| 7,802,286 B2 | 9/2010 | Brooks et al. | |
| 7,830,821 B2 | 11/2010 | Lin et al. | |
| 7,969,975 B2 | 6/2011 | Jiang et al. | |
| 8,045,570 B2 | 10/2011 | Allan et al. | |
| 8,230,050 B1 | 7/2012 | Brandwine et al. | |
| 8,326,873 B2 | 12/2012 | Ellis et al. | |
| 8,588,194 B2 | 11/2013 | Chen | |
| 8,626,846 B2 | 1/2014 | Coppens et al. | |

(Continued)

FOREIGN PATENT DOCUMENTS

| | | |
|---|---|---|
| EP | 1562390 A1 | 8/2005 |
| WO | WO-2009030282 | 3/2009 |

OTHER PUBLICATIONS

Non-Final Office Action, U.S. Appl. No. 13/271,047, dated Feb. 13, 2013, 15 pages.

(Continued)

*Primary Examiner* — Obaidul Huq
(74) *Attorney, Agent, or Firm* — Blakely Sokoloff Taylor & Zafman LLP

(57) ABSTRACT

A method implemented by a Broadband Network Gateway (BNG) of an Internet service provider to provide accessibility to a wide area network for a Residential Gateway (RG) upon a failure of a wireline connectivity between the BNG and the RG, the method including receiving a failure detect message indicating a connectivity failure at the BNG from the RG, deciding whether to re-route traffic by the BNG, sending a failure acknowledge message by the BNG to the RG notifying the RG that re-routing has been initiated, sending a traffic re-route request message by the BNG to a Packet Data Network Gateway (PDN GW) of a Long-Term Evolution (LTE) network requesting the PDN GW to re-route traffic, receiving a traffic re-route acknowledgement by the BNG from the PDN GW, and re-routing traffic between the RG and the BNG through the PDN GW by the BNG.

24 Claims, 16 Drawing Sheets

(56) References Cited

U.S. PATENT DOCUMENTS

| | | |
|---|---|---|
| 8,645,577 B2 | 2/2014 | Maeng et al. |
| 2004/0117339 A1 | 6/2004 | Thubert et al. |
| 2004/0148439 A1 | 7/2004 | Harvey et al. |
| 2005/0020265 A1 | 1/2005 | Funabiki et al. |
| 2005/0086371 A1 | 4/2005 | Jung |
| 2005/0132061 A1 | 6/2005 | T'Joens et al. |
| 2005/0159149 A1 | 7/2005 | Wen et al. |
| 2005/0185607 A1 | 8/2005 | Svensson et al. |
| 2006/0120386 A1 | 6/2006 | Rossi et al. |
| 2006/0184645 A1 | 8/2006 | Monette et al. |
| 2006/0224701 A1 | 10/2006 | Camp, Jr. |
| 2007/0064653 A1 | 3/2007 | Jang et al. |
| 2007/0160050 A1 | 7/2007 | Wang |
| 2007/0201508 A1 | 8/2007 | Blackford et al. |
| 2007/0217436 A1 | 9/2007 | Markley et al. |
| 2008/0013554 A1 | 1/2008 | Motegi et al. |
| 2008/0181240 A1 | 7/2008 | Jiang et al. |
| 2008/0192695 A1 | 8/2008 | Krishnan et al. |
| 2008/0256458 A1 | 10/2008 | Aldred et al. |
| 2008/0267215 A1 | 10/2008 | Blackburn et al. |
| 2008/0316974 A1 | 12/2008 | Krishnan et al. |
| 2009/0047016 A1 | 2/2009 | Bernard et al. |
| 2009/0047945 A1 | 2/2009 | Zhang et al. |
| 2009/0055900 A1 | 2/2009 | Gopalasetty et al. |
| 2009/0135829 A1* | 5/2009 | Zheng .................. 370/395.1 |
| 2009/0199040 A1* | 8/2009 | Liu et al. ..................... 714/4 |
| 2010/0080238 A1 | 4/2010 | Allan et al. |
| 2010/0186079 A1 | 7/2010 | Nice et al. |
| 2011/0026930 A1 | 2/2011 | Cui et al. |
| 2011/0040858 A1 | 2/2011 | Gum |
| 2011/0235549 A1 | 9/2011 | Ahlers et al. |
| 2012/0052857 A1* | 3/2012 | Kumar et al. .................. 455/424 |
| 2012/0087235 A1* | 4/2012 | Smith et al. ................... 370/221 |
| 2012/0189016 A1* | 7/2012 | Bakker et al. ................. 370/401 |
| 2012/0311108 A1 | 12/2012 | Brandwine et al. |
| 2012/0314617 A1 | 12/2012 | Erichsen et al. |
| 2012/0320736 A1* | 12/2012 | Hillier et al. .................. 370/218 |

OTHER PUBLICATIONS

Non-Final Office Action, U.S. Appl. No. 13/271,056, dated Mar. 11, 2013, 16 pages.

Notice of Allowance and Fees, U.S. Appl. No. 13/271,047, dated Oct. 11, 2013, 17 pages.

Troan, et al., RFC 3633—IPv6 Prefix Options for Dynamic Host Configuration Protocol (DHCP) version 6, Dec. 2003, 14 pages.

Non-Final Office Action, U.S. Appl. No. 13/271,056, dated Jan. 27, 2014, 18 pages.

Final Office Action, U.S. Appl. No. 13/271,047, dated Jul. 17, 2013, 20 pages.

Final Office Action, U.S. Appl. No. 13/271,056, dated Aug. 22, 2013, 17 pages.

Notice of Allowance, U.S. Appl. No. 13/271,047, dated Feb. 6, 2014, 7 pages.

Notice of Allowance, U.S. Appl. No. 13/271,056, dated May 13, 2014, 18 pages.

* cited by examiner

METHOD AND SYSTEM TO ENABLE RE-ROUTING FOR HOME NETWORKS UPON CONNECTIVITY FAILURE

FIELD OF INVENTION

The embodiments of the invention are related to the field of connectivity failure recovery. More specifically, the embodiments of the invention relate to a method and system for enabling traffic re-routing upon a wireline connectivity failure.

BACKGROUND

Home networks are utilized to connect devices in the home to one another and to the Internet. These home networks are connected to residential Internet service providers via a device known as a Residential Gateway (RG). This device provides physical and protocol connectivity between the home network and the access network (i.e., the core network of the Internet service provider including the Internet service provider's access control devices such as a Broadband Remote Access Server (BRAS) router or Broadband Network Gateway (BNG)). In this specification, BRAS and BNG are used interchangeably.

An RG can provide bridging or routing support for a home network. It typically also provides additional services such as firewall protection and network address translation. The RG can connect with the devices in a home using both wired and wireless protocols and connections. The RG can provide a set of Ethernet connections as well as a wireless local area network using IEEE 802.11(a/b/g/n). The RG can also be a point of service delivery for services such as Voice Over Internet Protocol (VOIP) or de-multiplexing for services like shared television delivery.

The wireline connectivity between an RG and an Internet service provider's access control devices such as a BNG is a critical link for home networks. Its failure will make devices in the home networks unreachable by the Internet service provider.

SUMMARY

A method implemented by a network element serving as a first Broadband Network Gateway (BNG) of an Internet service provider to provide accessibility to a wide area network for a second network element serving as a first Residential Gateway (RG) upon a failure of a wireline connectivity between the first BNG and the first RG. The method comprises the steps of receiving a failure detect message indicating a connectivity failure at the first BNG from the first RG, deciding whether to re-route traffic between the first BNG and the first RG, sending a failure acknowledge message by the first BNG to the first RG notifying the first RG that re-routing has been initiated in response to the first BNG deciding to re-route, sending a traffic re-route request message by the first BNG to a first Packet Data Network Gateway (PDN GW) of a Long-Term Evolution (LTE) network requesting the first PDN GW to re-route traffic between the first RG and the first BNG, receiving a traffic re-route acknowledgement by the first BNG from the first PDN GW in response to the traffic re-route request message, and re-routing traffic between the first RG and the first BNG through the first PDN GW by the first BNG.

A network element serving as a first Broadband Network Gateway (BNG) of an Internet service provider to provide accessibility to a wide area network for a second network element serving as a first Residential Gateway (RG). The network element comprises an uplink module to communicate with the wide area network, a wireline downlink module to communicate with the first RG, a Packet Data Network Gateway (PDN GW) interface module to communicate with a first PDN GW of a Long-Term Evolution (LTE) network, a network processor communicatively coupled to the uplink module, the wireline downlink module, and the PDN GW interface module. The network processor executes a re-route unit, the re-route unit including a connectivity monitoring module configured to receive a failure detect message indicating a connectivity failure from the first RG, a re-route initiation module configured to decide whether to re-route traffic between the first BNG and the first RG, a protocol messaging module configured to send a failure acknowledge message to the first RG notifying the first RG that re-routing has been initiated in response to the first BNG deciding to re-route, the protocol messaging module sending a traffic re-route request message to the first PDN GW requesting the first PDN GW to re-route traffic between the first RG and the first BNG, and the protocol messaging module configured to receive a traffic re-route acknowledgement from the first PDN GW in response to the traffic re-route request message, and a tunneling/pass-through module configured to re-route traffic between the first RG and the first BNG through the first PDN GW.

A method implemented by a network element serving as a Residential Gateway (RG) of an Internet service provider to provide accessibility to a wide area network for the RG upon failure of a wireline connectivity from the RG to a network element serving as a Broadband Network Gateway (BNG). The method is implemented on the RG and it comprises the steps of detecting a connectivity failure with the BNG that communicates with the RG, enabling a Long-Term Evolution (LTE) interface on the RG, sending a connectivity failure message by the RG to the LTE interface through a Packet Data Network Gateway (PDN GW) to the BNG, receiving a failure acknowledgement message from the BNG, and sending traffic to the BNG through the LTE interface on the RG.

A network element serving as a Residential Gateway (RG) of an Internet service provider to provide accessibility to a wide area network for the RG to a second network element serving as a Broadband Network Gateway (BNG). The network element comprises a wireline uplink module to communicate with the BNG, a Long-Term Evolution (LTE) interface module to communicate with a Packet Data Network Gateway (PDN GW) of an LTE network, a wireline downlink module to communicate to at least one device in a home network, and a network processor communicatively coupled to the wireline uplink module, the LTE interface module, and the wireline downlink module. The network processor executes a re-route unit, the re-route unit including a connectivity monitoring module configured to detect a connectivity failure with the BNG that communicates with the RG, a protocol messaging module configured to send a connectivity failure message through the LTE interface module to the BNG, the protocol messaging module configured to receive a failure acknowledgement message from the BNG, and a re-route to LTE module configured to send traffic to the BNG through the LTE interface on the RG.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one"

embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
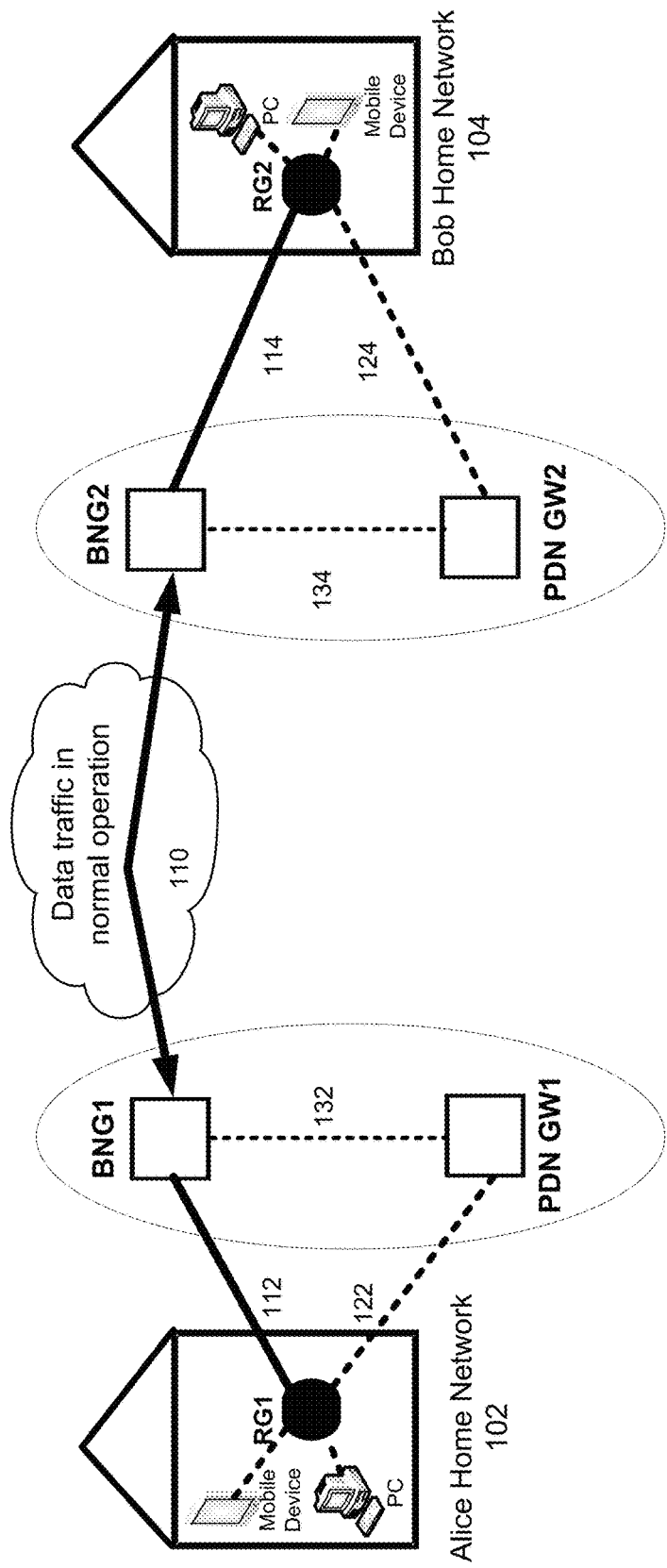
FIG. 1 is a block diagram illustrating one embodiment of a network configuration.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram will be described with reference to the exemplary embodiment of FIGS. 4 and 5. However, it should be understood that the operations of flow diagrams can be performed by embodiments of the invention other than those discussed with reference to FIGS. 7-8, 10, and 13-16, and the embodiments discussed with reference to FIGS. 4 and 5 can perform operations different than those discussed with reference to the flow diagrams of FIGS. 7-8, 10, and 13-16.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

A residential gateway (RG) is a critical part of a home network as it provides connectivity of home devices to the Internet. An RG provides physical and protocol connectivity between the home network and an access network of a residential Internet service provider through its connection to a broadband network gateway (BNG) of the access network. A wireline connectivity failure between the RG and the BNG makes home devices connecting to the RG not reach the Internet, thus it is desirable to have a backup mechanism to allow the Internet service provider to reach home networks in case of a failed wireline link between the RG and the BNG.

Long Term Evolution (LTE) is a standard for mobile communication of high-speed data. LTE has redesigned and simplified mobile network architecture to an IP-based system. The LTE specification provides downlink peak rates of 300 Mbits/s, uplink peak rate of 75 Mbits/s and QoS provisions permitting a transfer latency of less than 5 ms. With high bandwidth and low latency, LTE supports video, data as well as voice through VOIP. In an LTE system, a Packet Data Network (PDN) Gateway (PDN GW) provides connectivity between a user equipment (UE) and an external packet data network. A PDN GW acts as the point of entry and exit for traffic to the UE. Apart from controlling IP data services, a PDN GW also does routing, allocates IP addresses, provides access for non-LTE network and even enforces policy.

As LTE networks being rolling out, the trend is for home networks to have access to LTE networks. Some telecommunication equipment manufacturers have started to implement RG with LTE capabilities. For example, an RG model with an LTE interface has been deployed by Vodafone in the United Kingdom. The existence of RGs with interfaces connecting with both a wireline network through a BNG and a mobile network through a PDN GW allows a network operator to mitigate the impact of a wireline connectivity failure between a BNG and an RG.

The embodiments of the invention provide a method and system for avoiding the disadvantages of the prior art. The embodiments of the invention provide re-routing to a Long Term Evolution (LTE) network so that a home network can re-route traffic through an LTE network upon the wireline connectivity failure. After the wireline connectivity restores, the RG and the BNG may halt traffic re-routing and use the wireline for traffic routing.

FIG. 1 is a block diagram illustrating a network configuration. On one side of the network is Alice home network 102, and the other side is Bob home network 104. In each home network, there is an RG connecting to home devices in the network. Home devices come with a variety of forms and functions, including computers, tablets, set-top boxes, console devices, handheld devices, wireless terminals, digital photo frames, and Voice-over-IP (VOIP) terminals. These home devices are represented by PCs and mobile devices in FIG. 1. Home devices communicate with RGs, which route traffic to BNGs to enable communication with other devices over a wide area network such as the Internet. For example, at Alice Home Network 102, RG1 connects to BNG1 through wireline 112. At Bob Home Network 104, RG2 connects to BNG2 through wireline 114. When two home devices in separate home networks 102 and 104 communicate with each other (e.g., the two mobile devices text each other), traffic will be routed by BNG1 and BNG2 through the wide area network over a logical link, and in the example, the logical link connecting BNG1 and BNG2 is designated as link 110.

An RG can have an LTE interface. With an LTE interface, an RG can communicate with an LTE network through a Packet Data Network Gateway (PDN GW), which provides connectivity for the RG to a mobile network. An RG LTE interface can be preconfigured so it remains in sleeping mode without actively routing traffic. The preconfiguration includes assigning an IPv6 address for the LTE interface so that it can be communicate with other network elements in a LTE network. A PDN GW can be pre-configured with parameters such as an RG's IPv6 address so it can discover the RG. In the illustrated example, both RG1 and RG2 have LTE interfaces. RG1 communicates to PDN GW1 through mobile link 122 and RG2 communicates to PDN GW2 through mobile link 124 respectively. A PDN GW can communicate not only to an RG, but also a BNG. A PDN GW can be pre-configured with the required parameters (e.g., a BNG's IPv6 addresses) and it can discover a BNG associated with a particular RG and establish secure communication. Similarly, a BNG can be pre-configured with the parameters such as a PDN GW's IPv6 addresses so that it can establish a secure communication with a PDN GW. In the example embodiment of FIG. 1, BNG1 communicates with PDN GW1 through mobile link 132 and BNG 2 communicates with PDN GW2 through mobile link 134 respectively. In normal operation, traffic between Alice Home Network 102 and Bob Home Network 104 goes through link 112, 110 and 114, and the mobile links 122, 132, 134, and 124 do not route traffic. In other embodiments, the links between the BNG and PDN GW can be partially or wholly wired or similar connections or any combination of wired and wireless connections.

Figure 2:
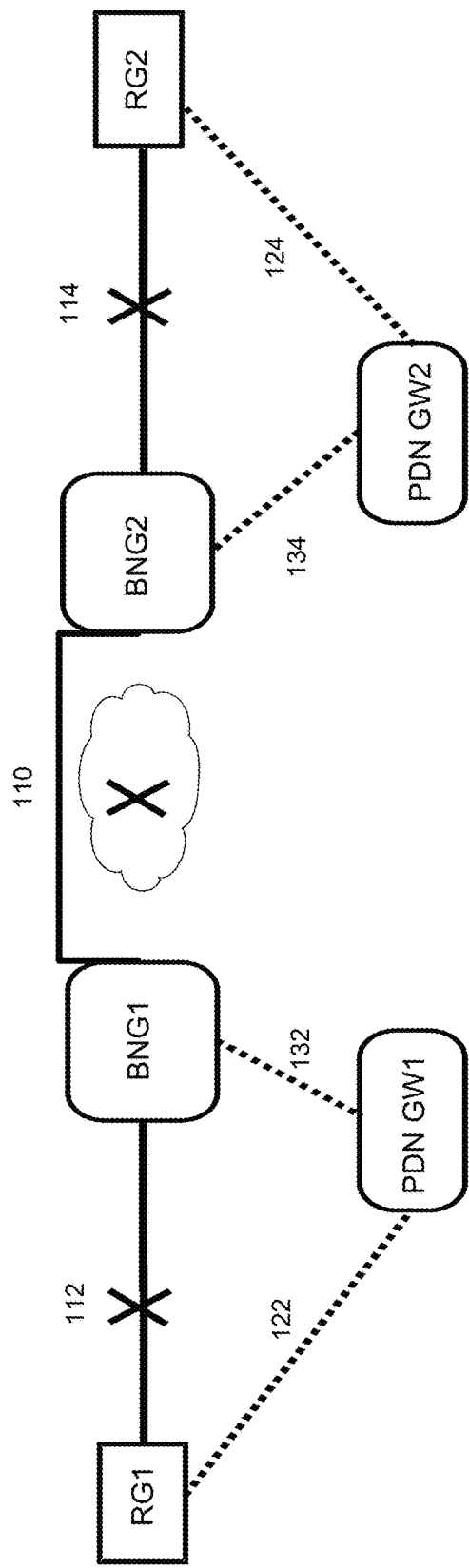
FIG. 2 is a block diagram illustrating network failure scenarios.

FIG. 2 is a block diagram illustrating network failure scenarios. In a network connecting RGs and BNGs, there are a number of connections that can affect communication of traffic between an RG (and the connected home devices) and other devices over a wide area network or local network. In the illustrated example, three segments of the connectivity can fail. The three segments are the wireline link 112 between RG1 and BNG1, the Internet connection 110 between BNG1 and BNG2, and the wireline link 114 between RG2 and BNG2. The failure affects communication such as traffic between RG1 and RG2 or their respective home devices. The embodiments described further herein below address these failure scenarios.

Figure 3:
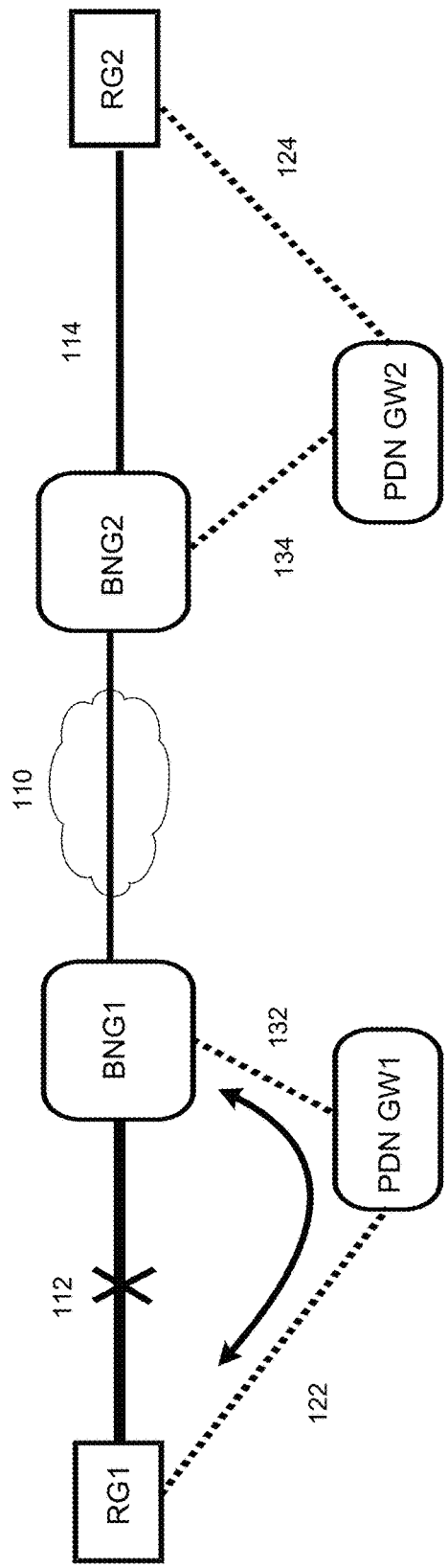
FIG. 3 is a block diagram illustrating one embodiment of re-routing upon a failure scenario.

FIG. 3 is a block diagram illustrating re-routing upon a failure scenario. In this scenario, the wireline link 112 fails, and RG1 can no longer reach BNG1 through the wireline connection, thus RG1 can no longer communicate with any device over the Internet through the wireline. Upon RG1 detecting the wireline failure, RG1 activates its LTE interface. Through protocols discussed in detail below, RG1 establishes a re-route channel through PDN GW1 to BNG1. Thus traffic through wireline link 112 is re-routed through mobile links 122 and 132, and RG1 can continue to communicate with other devices over the Internet and through other RGs. In the illustrated example, the network is symmetric, and the protocol used for re-routing at a failure of mobile link 112 can be used at a failure of mobile link 114 as well and is executed by the RG2, BNG2 and PDN GW2 in an analogous manner. Further, one skilled in the art would understand that a failure in a wireline connection between an RG and BNG can occur in other network topographies and the principles and features described herein are applicable to these alternate topologies as well.

Figure 4:
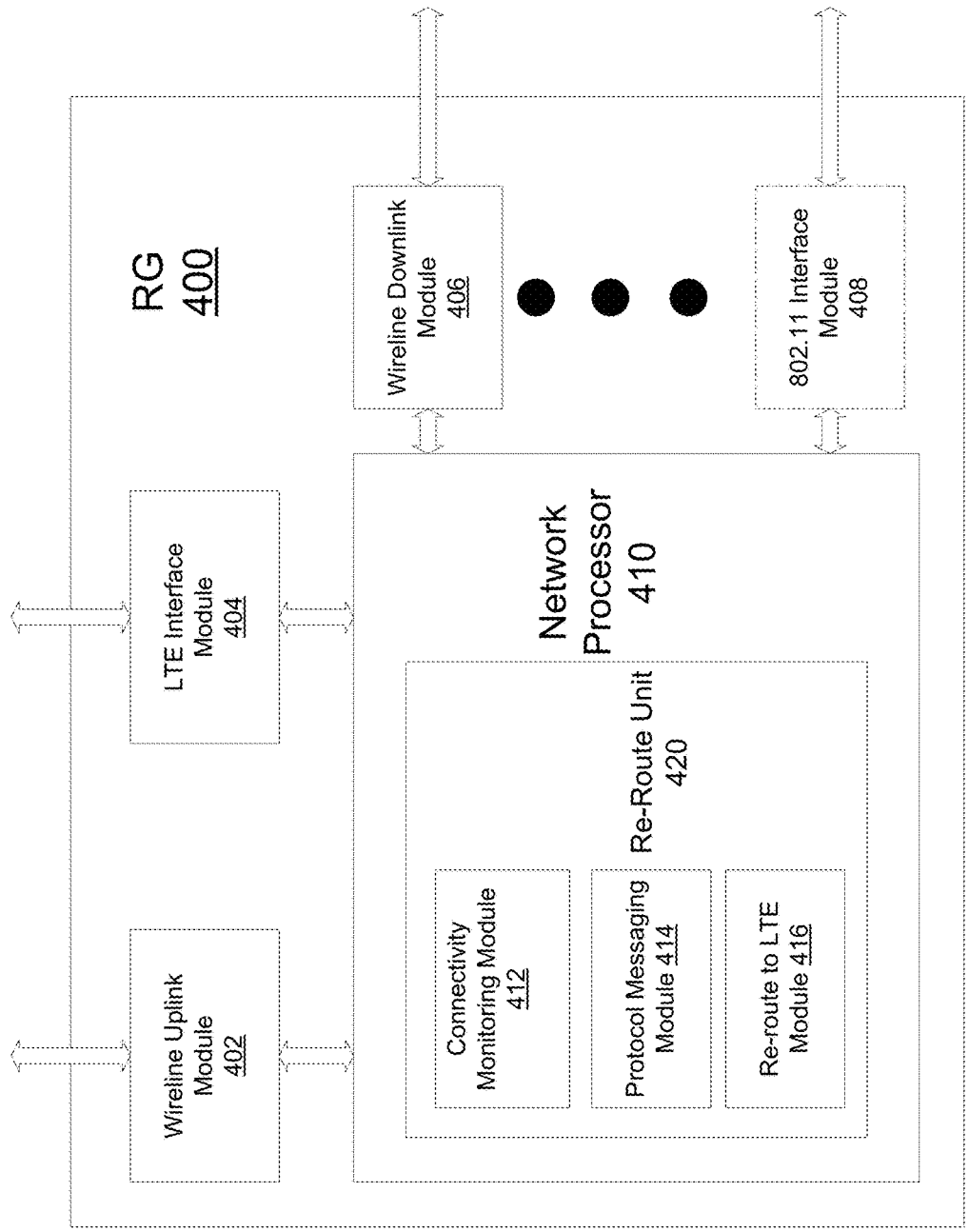
FIG. 4 is a block diagram illustrating one embodiment of an RG.
Figure 5:
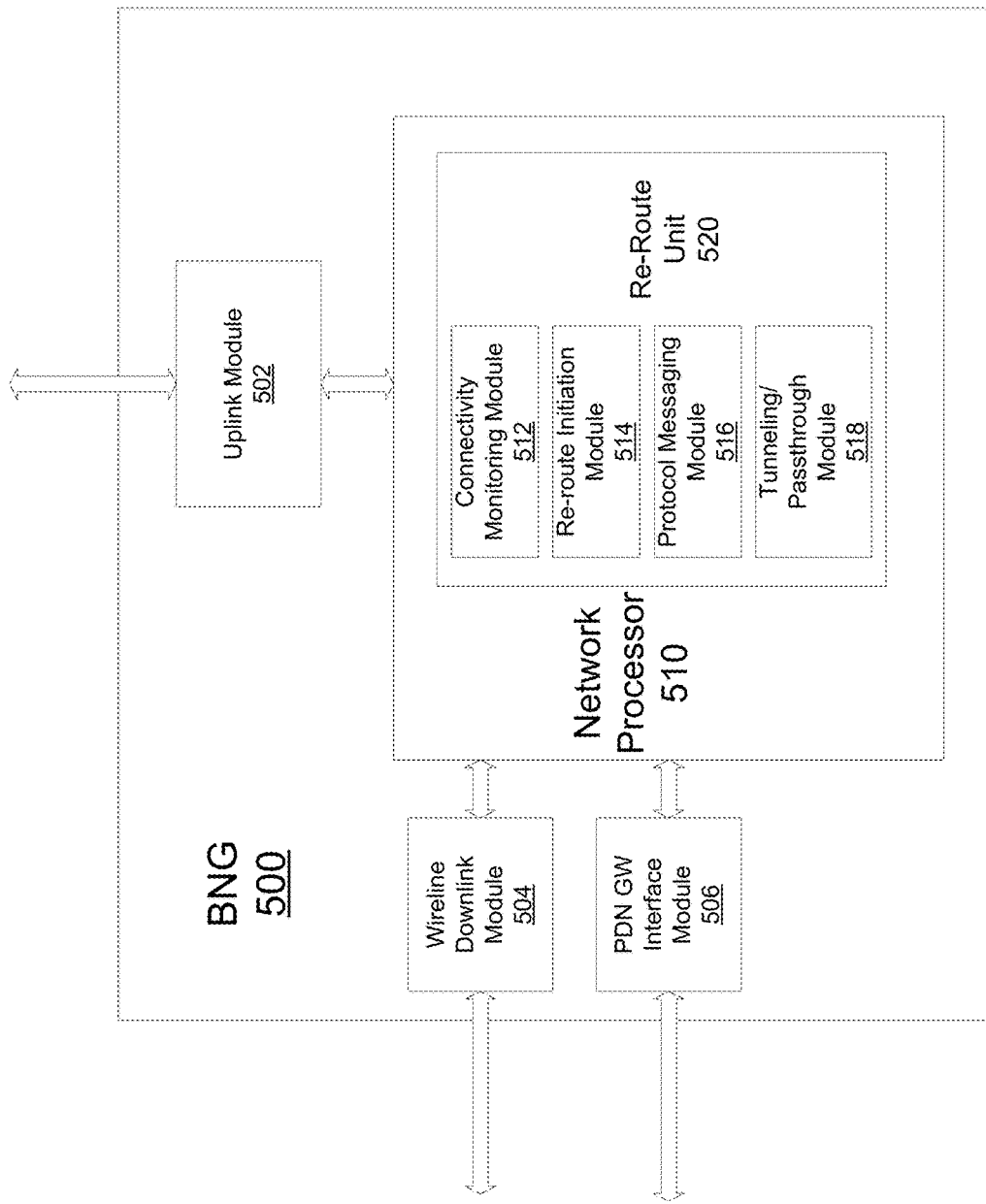
FIG. 5 is a block diagram illustrating one embodiment of a BNG.

FIG. 4 and FIG. 5 illustrate two network elements serving as an RG and a BNG respectively. In one embodiment, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card can be used to terminate IPsec tunnels and execute the attendant authentication and encryption algorithms.

FIG. 4 is a block diagram illustrating an RG. RG 400 contains a wireline uplink module 402 that communicates with an uplink BNG. RG 400 can also contain an LTE interface module 404 that communicates with an LTE network through a PDN GW of the LTE network. The LTE interface module 404 can exchange signaling and traffic with the closest Radio Base Station (RBS) of the LTE network, and the RBS routes traffic from the RG to a PDN GW, thereby establishing communication to the LTE network. RG 400 can also contain several modules to communicate with home devices. For example, a wireline downlink module 406 manages wireline connections to home devices (e.g. a set top box at home), and an 802.11 interface module 408 manages wireless connections to home devices (e.g., a mobile device).

In one embodiment, RG 400 contains a network processor 410, which includes a re-route unit 420. The re-route unit 420 contains a connectivity monitoring module 412 that monitors connectivity status between RG 400 and other devices (e.g., a connecting uplink BNG). The re-route unit 420 contains a protocol messaging module 414 that manages protocol exchanges between RG 400 and other network elements. The re-route unit 420 also contains a re-route to LTE module 416 that manages traffic re-routing to an LTE network and traffic restoration from an LTE network. The functionality of these components of the re-route unit 420 is described in further detail herein below in relation to the flowcharts describing the corresponding functions.

FIG. 5 is a block diagram illustrating a BNG. BNG 500 contains an uplink module 502 that manages connectivity of BNG 500 to an uplink network element (e.g., a router) so that BNG 500 can reach Internet. BNG 500 contains a wireline downlink module 504 that manages connection of BNG 500 to a wireline downlink network element (e.g., an RG). BNG 500 also contains a PDN GW interface module 506 that manages connectivity of BNG 500 to a PDN GW so that BNG 500 can communicate to an LTE network.

Network processor 510 is a critical part of BNG 500 which includes re-route unit 520. Re-route unit 520 contains a connectivity monitoring module 512 managing connectivity status of connections between BNG 500 and other network elements (e.g., uplink network elements, RGs, and PDN GWs). Re-route unit 520 contains a re-route initiation module 514 that decides whether or not to initiate traffic re-routing. In one embodiment, the re-routing decision is not made at the RG, but at the BNG instead. The centralized decision-making facilitates management of the re-routing process by an Internet service provider. Re-route unit 520 contains a protocol messaging module 516 that manages protocol exchanges between BNG 500 and other network elements. Re-route unit 520 also contains a tunneling/passthrough module 518 that manages re-routing traffic between BNG 500 and a connecting RG. Traffic between BNG 500 and an RG can be tunneled through a PDN GW and it can also be passed through a PDN GW without dropping at the PDN GW as discussed further herein below. Also, the functionality of these components of the re-route unit 520 is described in further detail herein below in relation to the flowcharts describing the corresponding functions.

Note that the network processors 410 and 510 can be general purpose or special purpose processors. The individual modules in RG 400 and BNG 500 can contain their dedicated network process units (NPU) or they can share NPUs among multiple modules. Also note that various modules can be implemented as a single unit or multiple units can combine two or more units within RG 400 and BNG 500 respectively, and these modules can be implemented in software, hardware or a combination thereof.

Single Connectivity Failure

Figure 6:
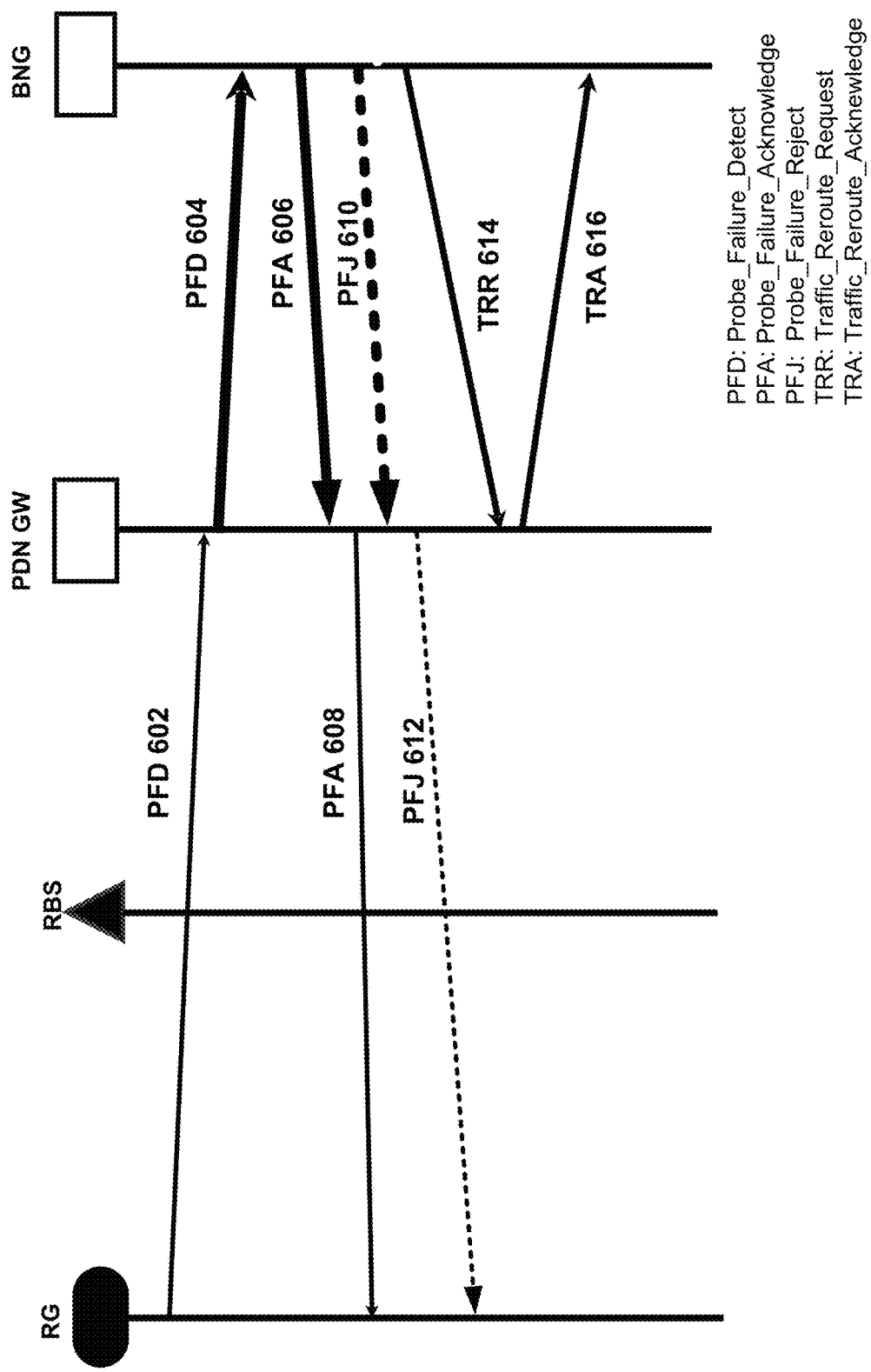
FIG. 6 is a flow diagram illustrating one embodiment of a hand-shake protocol upon connectivity failure.

FIG. 6 is a flow diagram illustrating a hand-shake protocol upon a connectivity failure. The process starts when an RG detects a connectivity failure with its connecting BNG. Once the RG detects the failure, it activates its LTE interface. As discussed herein above, the RG has a pre-configured LTE interface with an IPv6 address for communicating with other LTE network elements. The RG sends a failure detect message, probe_failure_detect (PFD) 602, to a PDN GW of a LTE network. PFD 602 reaches the PDN GW through communicating with a RBS of the LTE network. Once the PDN GW receives PFD 602, it sends a PFD 604 with the same information to its connecting BNG. Once the BNG receives the failure detect message, it determines whether or not to initiate traffic re-routing. If the BNG decides not to initiate traffic re-routing, it sends a rejection message, probe_failure_reject (PFJ) 610, to the PDN GW. The PDN GW in turn sends a PFJ 612 with the same information to the RG that sent PFD 602. In this case, no traffic re-routing happens. However, if the BNG decides to initiate traffic re-routing, it sends a failure acknowledgment message, probe_failure_acknowledgement (PFA) 606, to the PDN GW, which sends a PFA 608 with the same information to the RG that sent PFD 602. Then the BNG sends a re-routing request message, traffic_reroute_request (TRR) 614, to the PDN GW requesting traffic re-routing. Once the PDN GW receives TRR 614, it sends a re-routing acknowledgment message, traffic_reroute_acknowledge (TRA) 616, to the requesting BNG, and the BNG reroutes traffic to the RG sending PFD 602 through the PDN GW.

Figure 7:
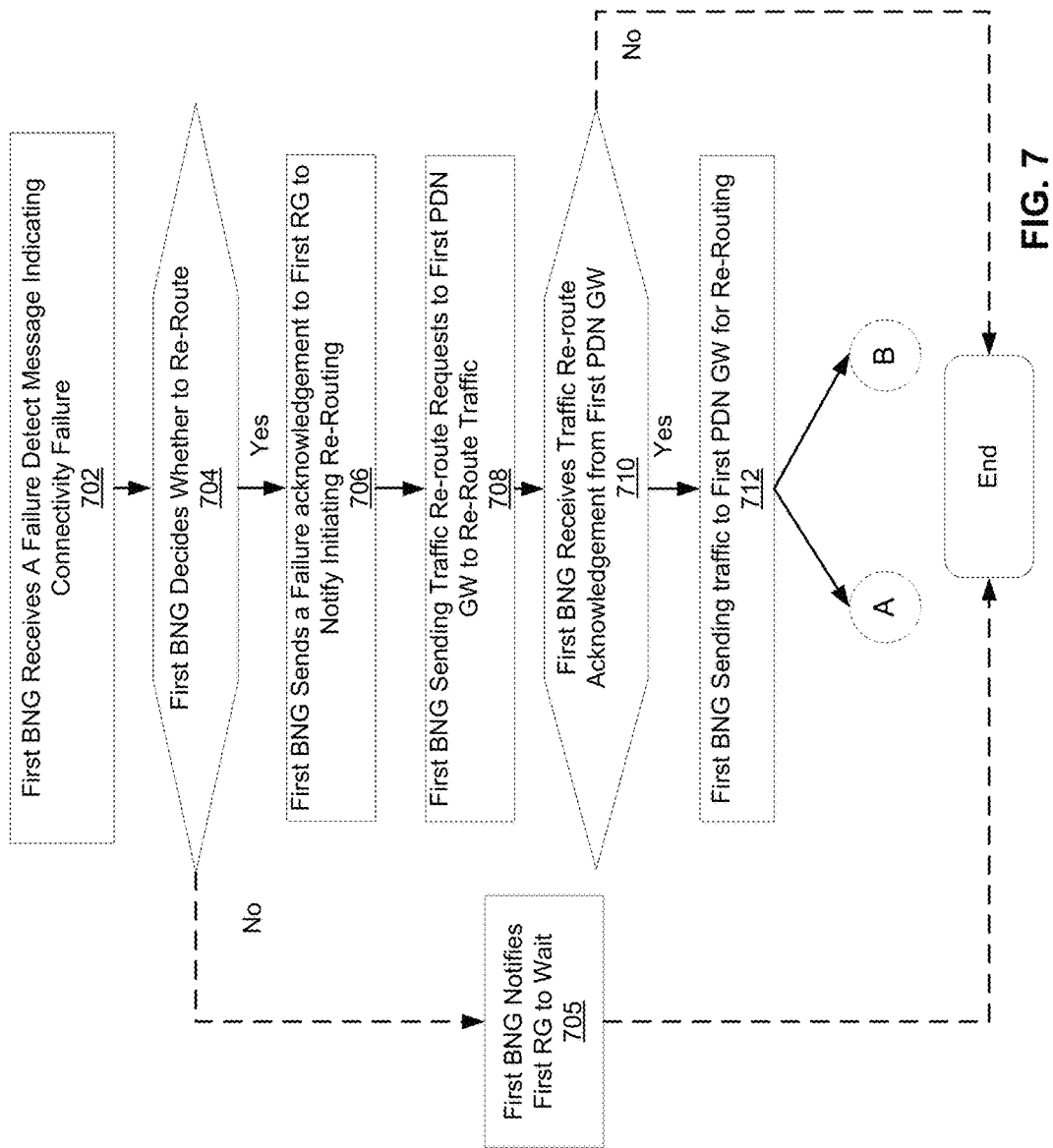
FIG. 7 is a flow diagram illustrating one embodiment of a re-routing process at a BNG.

FIG. 7 is a flow diagram illustrating a re-routing process executed by a BNG. While FIG. 6 shows all the network messaging elements involved in the traffic re-routing process, FIG. 7 focuses on the process steps executed by the BNG. The process starts when a BNG, designated as a first BNG, receiving a failure detect message indicating a wireline connectivity failure at block 702. The failure detect message is sent by an RG, designated as a first RG, through a corresponding PDN GW, designated as the first PDN GW, since the wireline connection is down. The first BNG decides whether or not to initiate traffic re-routing at block 704. The BNG can determine whether to initiate the re-routing of traffic based on configuration information, traffic priority, traffic sources, traffic destinations or similar criteria or combinations thereof.

If the BNG decides not to initiate traffic re-routing, it can notifies the first RG with a message notifying the first RG to wait. This message is sent to the RG through the first PDN GW at block 705, and the process end. This is an optional step, and in other embodiments, the first BNG can choose to ignore the first RG without sending any message in the case where re-routing is not executed.

If the first BNG decides to initiate traffic re-routing, it sends a failure acknowledgment message to the first RG, through the first PDN GW at block 706. In one embodiment, the first BNG can include a failure detect message indicating that it has also detected the connectivity failure. Then the first BNG sends a traffic re-route request to the first PDN GW at block 708. Steps in block 706 and block 708 may be executed concurrently. The first BNG waits for the traffic re-route acknowledgment from the first PDN GW at block 710. If the first BNG receives the traffic re-route acknowledgement message, then the traffic re-route starts at block 712. Otherwise, the process stops. The first BNG can wait for any amount of time for the traffic re-rout acknowledgement as a timeout process or similar process. In the case where the traffic re-rout acknowledgement is received, the process can optionally continue at cycle A and cycle B as discussed further herein below. Note the first BNG exchanges messages with the first RG through the RG's LTE interface since the wireline connection between the first BNG and the first RG is down.

There are a variety of ways to re-route traffic. Data traffic tunneling can be used to re-route traffic between the first BNG and the first RG through the first PDN GW. Data traffic tunneling can be implemented using protocols like RFC 2473 or similar tunneling protocols. Another way to re-route traffic between the first BNG and the first RG through the first PDN GW is through pass-through as discussed further herein below.

Figure 8:
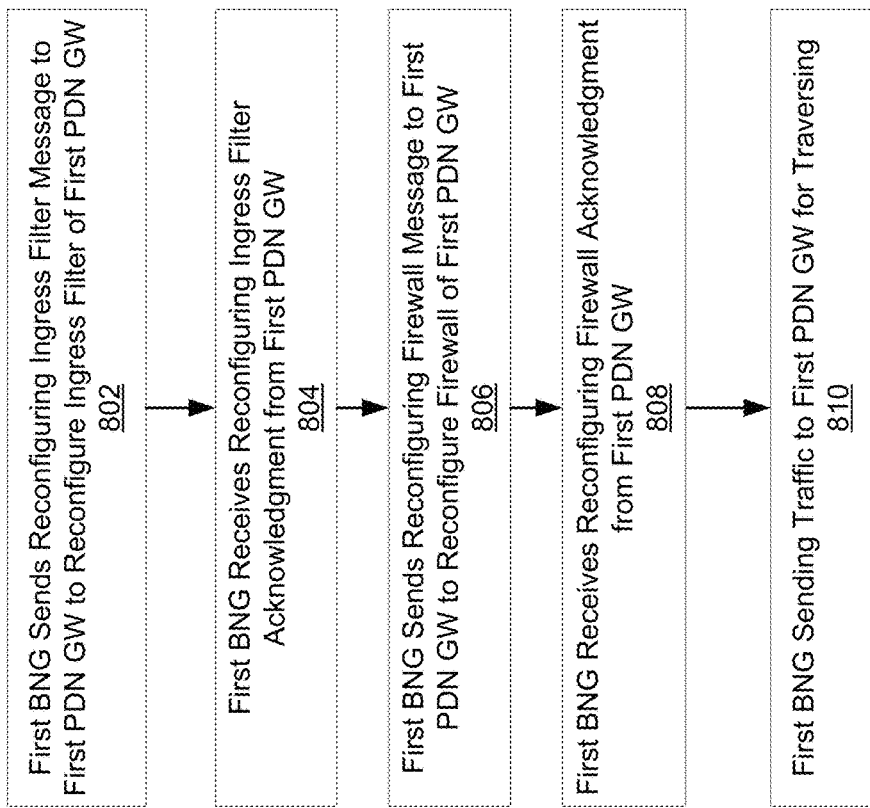
FIG. 8 is a flow diagram illustrating one embodiment of a traffic pass-through process at a BNG.

FIG. 8 is a flow diagram illustrating a traffic pass-through process at a BNG. Once a BNG, designated as the first BNG, decides to re-route traffic to an RG through a PDN GW, designated as the first PDN GW, the first BNG sends reconfiguring ingress filter message to the first PDN GW requesting to reconfigure an ingress filter for the RG of the first PDN GW at block 802. The first PDN GW reconfigures the ingress filter to cause the subscriber facing policy rules to allow the first PDN GW to receive traffic from the first RG. The first PDN GW then sends a reconfiguring ingress filter acknowledgment to the first BNG. The first BNG receives the reconfiguring ingress filter acknowledgment from the first PDN GW at block 804. Then the first BNG sends a reconfiguring firewall message to the first PDN GW requesting to reconfigure a firewall for the RG of the first PDN GW at block 806. The first PDN GW reconfigures the firewall to enable traffic forwarding between the first RG and the first BNG. The reconfiguration allows the first PDN GW to receive traffic from the Internet for subscribers connecting to the first RG. The first PDN GW then sends a reconfiguring firewall acknowledgment to the first BNG. At block 808, the first BNG receives the reconfiguring firewall acknowledgment from the first PDN GW. With both the ingress filter and the firewall at the PDN GW being reconfigured, the traffic from both the first BNG and the first GW do not need to be encapsulated and decapsulated at the first PDN GW. Thus the first BNG sends traffic to the RG passing through the first PDN GW at block 810.

Connectivity Recovery

Figure 9:
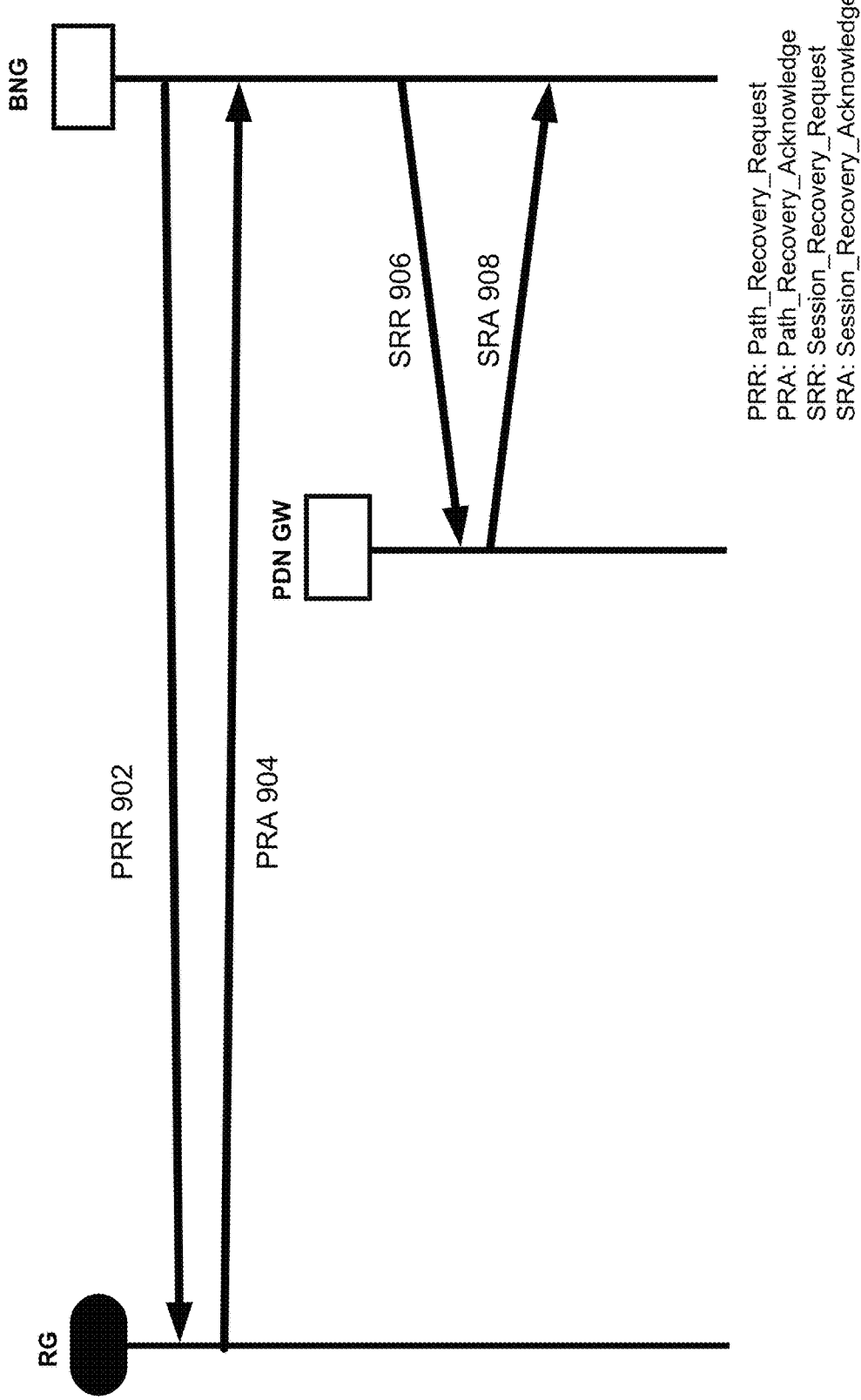
FIG. 9 is a flow diagram illustrating one embodiment of a hand-shake protocol upon connectivity recovery.

FIG. 9 is a flow diagram illustrating a hand-shake protocol upon connectivity recovery. Traffic re-routing is triggered by a wireline connectivity failure, and the re-routing will continue through a PDN GW as long as the wireline connection is inoperative. However, once the failed wireline is recovered, the BNG should be able to restore traffic over the recovered wireline.

The process starts with a BNG determining that the failed wireline has been restored. A BNG can make the determination after it detects wireline recovery, after it receives a request from a re-routing RG to restore, or after other threshold events. Then the BNG determines whether or not to initiate a restoration process. It can decide to keep traffic re-routing even though the wireline has been restored. The restoration decision can be guided by network administrator set policies or similar pre-defined rules. Once a BNG decides to restore traffic, it sends a recovery request message, path_recovery_request (PRR) 902, to an RG connected to the recovered wireline through the recovered wireline. The RG sends an acknowledgment, path_recovery_acknowledge (PRA) 904, back to the BNG through the recovered wireline. After receiving the acknowledgment, the BNG sends a session recovery request message, session_recovery_request (SRR) 906, to a PDN engaged in the re-routing. The PDN replies with an acknowledgment, session_recovery_acknowlege (SRA) 908, back to the BNG. After the BNG receives SRA 908, it halts traffic re-route to the PDN GW and routes traffic to the RG over the recovered wireline. In one embodiment, the RG can keep its IPv6 address of its LTE interface but deactivates its LTE interface and places the LTE interface in a sleep mode.

Figure 10:
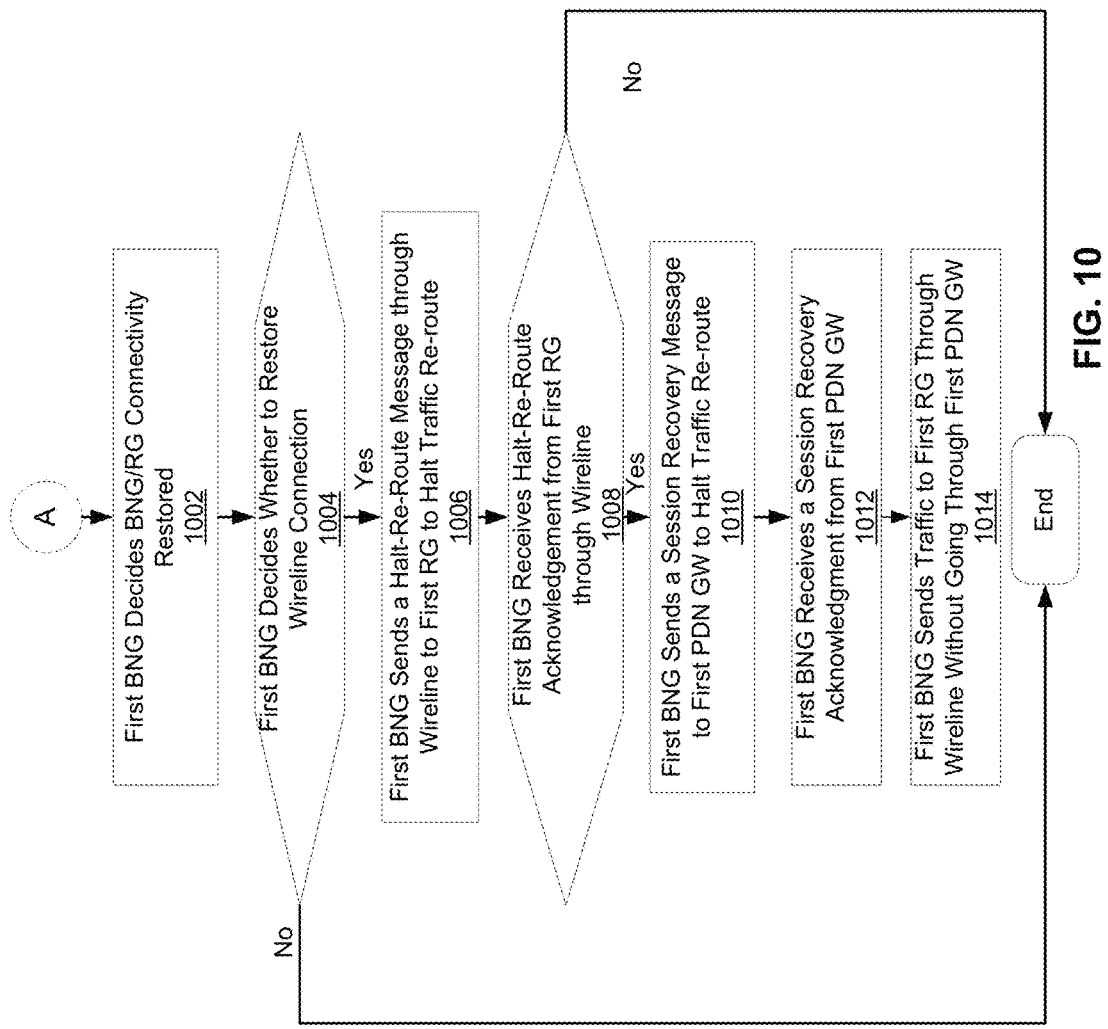
FIG. 10 is a flow diagram illustrating one embodiment of a traffic recovery process at a BNG.

FIG. 10 is a flow diagram illustrating a traffic recovery process at a BNG. The process can be viewed as a continuation of the re-routing process illustrated in FIG. 7 as a recovery process follows a failure process. The recovery process starts at cycle A, which is also shown at FIG. 7. The first BNG decides whether the connectivity between the first BNG and the first RG has been restored at block 1002. It may make the decision based on detecting wireline status of the wireline between the first BNG and the first RG, receiving a request to restore message from the re-routing first RG, or other threshold events. Once the first BNG decides that the connection has restored, then it determines whether or not to restore traffic on the restored wireline at block 1004. The restoration decision can be guided by network administrator set policies or similar pre-defined rules. If the first BNG decides not to restore traffic on the restored wireline, the process ends. Otherwise it sends a halt-re-route message (e.g., a PRR message) to the first RG through the restored wireline at block 1006. Afterward, the first BNG waits for a halt-re-route acknowledgment (e.g., a PRA message) from the first RG at block 1008. If the first BNG does not receive a halt-re-route acknowledgment from the first RG, the process ends and no traffic restoration happens. Otherwise after the first BNG receives the halt-re-route acknowledgment, the first BNG sends a session recovery message (e.g., a SRA message) to the first PDN GW at block 1010. Then the first BNG waits for a session recover acknowledgement message (e.g. a SRR message) at block 1012. After the acknowledgement message is received, the first BNG sends traffic to the first RG through the restored wireline without going through the first PDN GW.

Double Connectivity Failure

Figure 11:
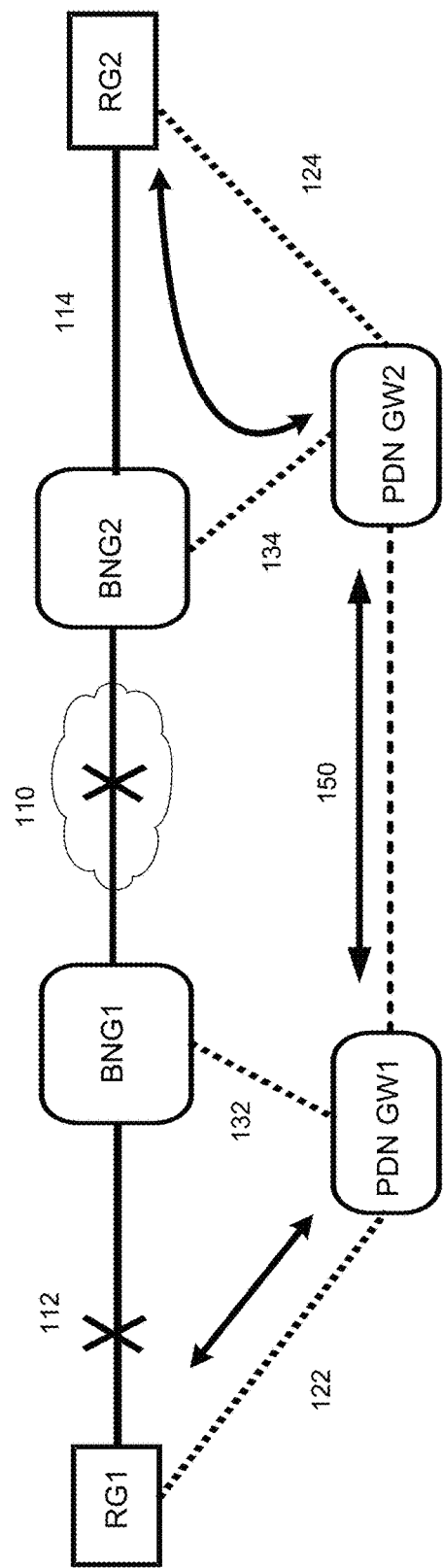
FIG. 11 is a block diagram illustrating one embodiment of a traffic re-routing process in a double-failure scenario.
Figure 12:
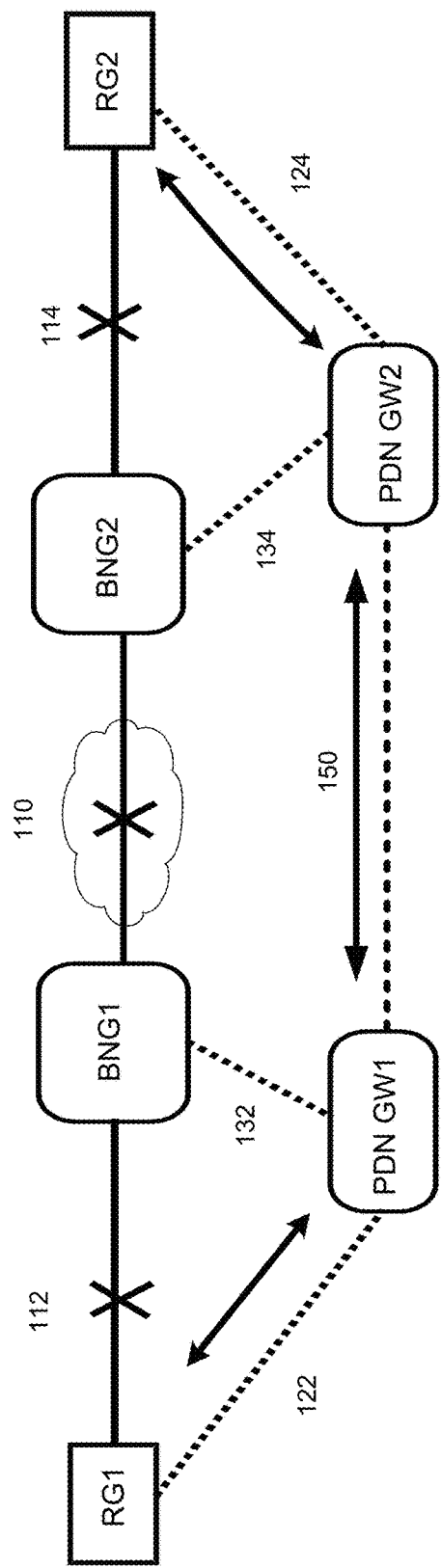
FIG. 12 is a block diagram illustrating one embodiment of another traffic re-routing process in a double-failure scenario.

FIG. 11 and FIG. 12 are two block diagrams illustrating traffic re-routing process in double-failure scenarios according to embodiments of the invention. Similar to that which is shown in FIG. 2, all three segments (wireline link 112 between RG1 and BNG1, the Internet connection 110 between BNG1 and BNG2, and the wireline link 114 between RG2 and BNG2) can fail. In both FIG. 11 and FIG. 12, link 110 fails so that BNG1 and BNG2 cannot communicate directly. The communication between the RG1 and RG2 then is re-routed through PDN GWs on an LTE networks. PDN GW1 is engaged in the re-routing already as discussed above in single connectivity failure scenarios. Since PDN GW2 connects to BNG2 and RG2, it will be requested to re-route traffic for BNG2. A mobile link 150 between PDN GW1 and PDN GW2 is established through coordination between the BNGs and PDN GWs as discussed herein below. In other embodiments, the link between PDN GW1 and PDN GW2 can be any combination of wireline and wireless mobile links.

FIG. 11 shows link 114 is in a working condition. In this case, traffic exchanged with RG2 can still go through BNG2, that is, traffic coming to PDN GW2 can be sent to BNG2 first, and then goes through the working wireline link 114. In FIG. 12, on the other hand, link 114 also fails. RG2 needs to activate its LTE interface so that traffic can be re-routed to RG2 through its mobile link 124. The destination PDN GW, PDN GW2 in FIGS. 11 and 12, determines whether or not it needs to route traffic through an LTE interface of a destination RG, RG2 in FIGS. 11 and 12. Note FIG. 12 shows a triple failure case, but since the main differentiator between single failure and FIG. 11 and FIG. 12 is that the link between BNGs fails, the triple failure scenarios can be considered together with double failure scenarios where one of the failed links occurs between BNGs. If a double failure happens on only on link 112 (between RG1 and BNG1) and link 114 (between RG2 and BNG2), the scenario is similar to a single failure case but with two PDN GWs being engaged, yet the two PDN GWs do not necessarily communicate with each other. Here discussion on double connectivity failure focuses on double failures including a BNG-BNG connectivity failure.

Figure 13:
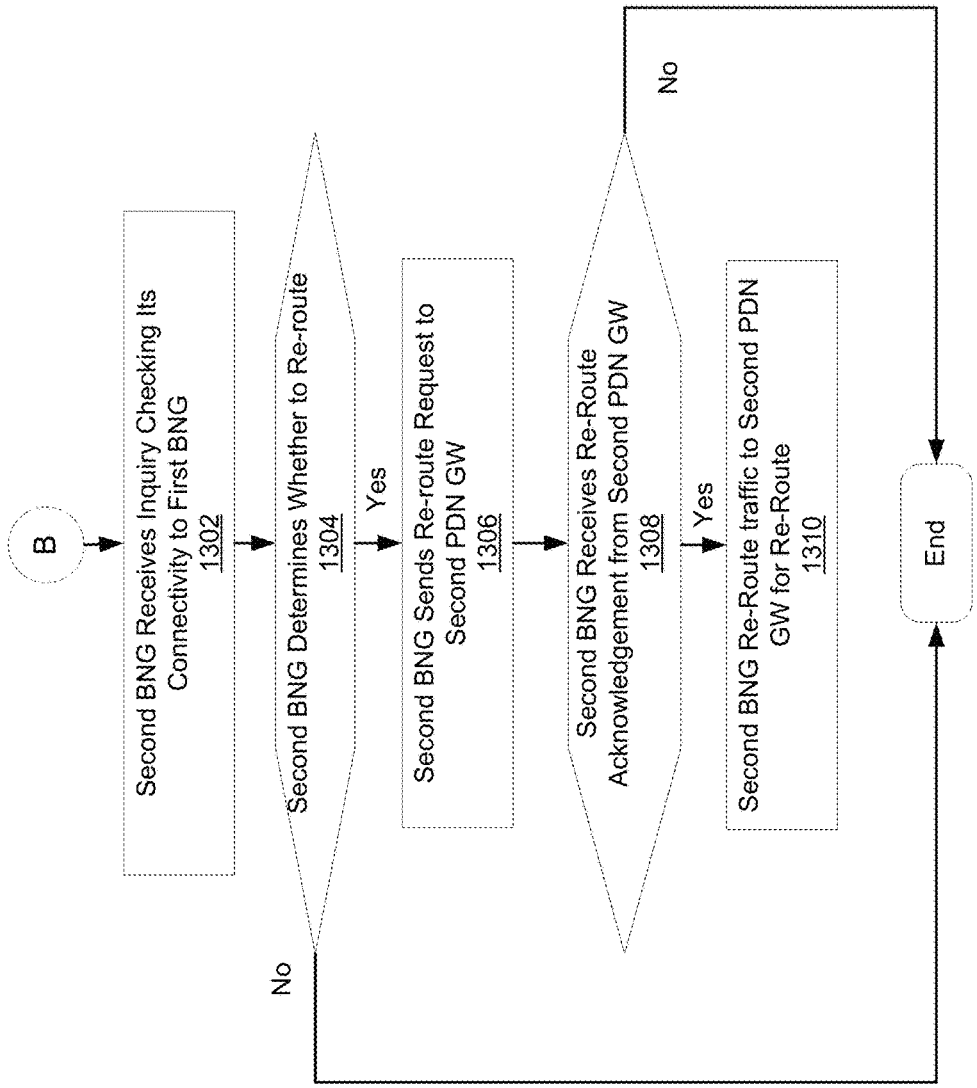
FIG. 13 is a flow diagram illustrating one embodiment of a re-routing at a BNG upon a double-failure scenario.

FIG. 13 is a flow diagram illustrating a re-routing at a BNG upon a double-failure scenario. The diagram can be considered as a continuation of process described in relation to FIG. 7. As in a double failure scenario, one link has to fail first. After the first link fails, the BNG that has initiated the traffic re-route process checks its connectivity to other BNGs that have active traffic going to the RG with active re-routing. At block 1302, a BNG, designated as a second BNG, receives an inquiry from the first BNG, and it checks its connectivity to the first BNG. At block 1304, the second BNG decides whether or not to start traffic re-routing for its RG, designated as a second RG, through its corresponding PDN GW, designated as a second PDN GW. The re-routing decision can be guided by network administrator set policies or similar predefined rules. If the second BNG decides not to initiate re-routing, the process ends. Otherwise the second BNG sends a re-route request to the second PDN GW at block 1306. If the second BNG does not receive a re-route acknowledgment message from the second PDN GW at block 1308, the process ends. Otherwise, the second BNG will re-route traffic to the second RG through the second PDN GW at block 1310. The mobile link 150 shown in FIGS. 11 and 12 is established and traffic between BNG1 and BNG2 are re-routed through PDN GW1 and PDN GW2.

There are a variety of ways to re-route traffic. Data traffic tunneling can be used to re-route traffic between the first PDN GW and the second RG through the second PDN GW. As discussed earlier, data traffic tunneling can be implemented using any number of tunneling protocols. Another way to re-route traffic between the first PDN GW and the second RG through the second PDN GW is through traffic pass-through, where traffic does not go through encapsulation and decapsulation at the second PDN GW.

Figure 14:
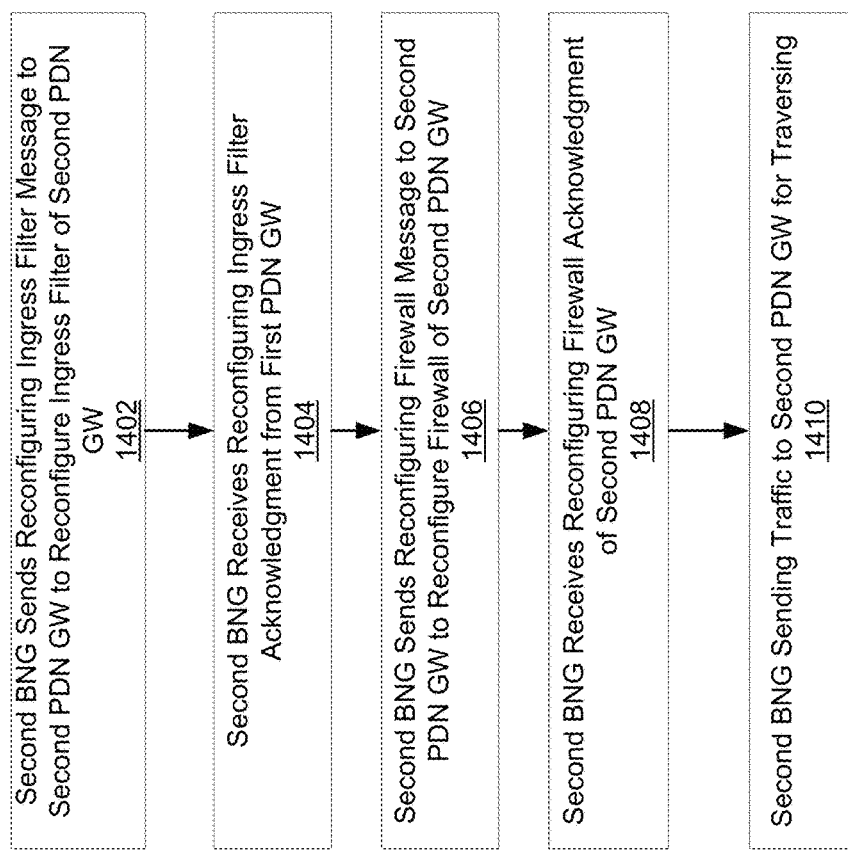
FIG. 14 is a flow diagram illustrating one embodiment of traffic pass-through at a BNG upon a double-failure scenario.

FIG. 14 is a flow diagram illustrating a traffic pass-through process at a BNG. As the traffic re-route follows the process discussed above in regard to FIG. 13, the same designations are used. The second BNG sends a reconfiguring ingress filter message to the second PDN GW requesting to reconfigure an ingress filter of the second PDN GW at block 1402. The second PDN GW reconfigures the ingress filter to enable traffic forwarding between the first PDN GW and the second BNG and the second PDN GW and sends a reconfiguring ingress filter acknowledgment to the first BNG. The second BNG receives a reconfiguring ingress filter acknowledgment from the second PDN GW at block 1404. Then the second BNG sends a reconfiguring firewall message to the second PDN GW requesting to reconfigure a firewall for the second RG of the second PDN GW at block 1406. The second PDN GW reconfigures the firewall to enable traffic forwarding between the fist PDN GW and the second BNG. At block 1408, the second BNG receives a reconfiguring firewall acknowledgment from the second PDN GW. With both the ingress filter and the firewall at the second PDN GW being reconfigured, the traffic from both the first PDN GW and the second BNG do not need to be encapsulated and decapsulated at the second PDN GW. Thus the second BNG sends traffic passing through the second PDN GW at block 1410.

Traffic Re-Routing on RG

Figure 15:
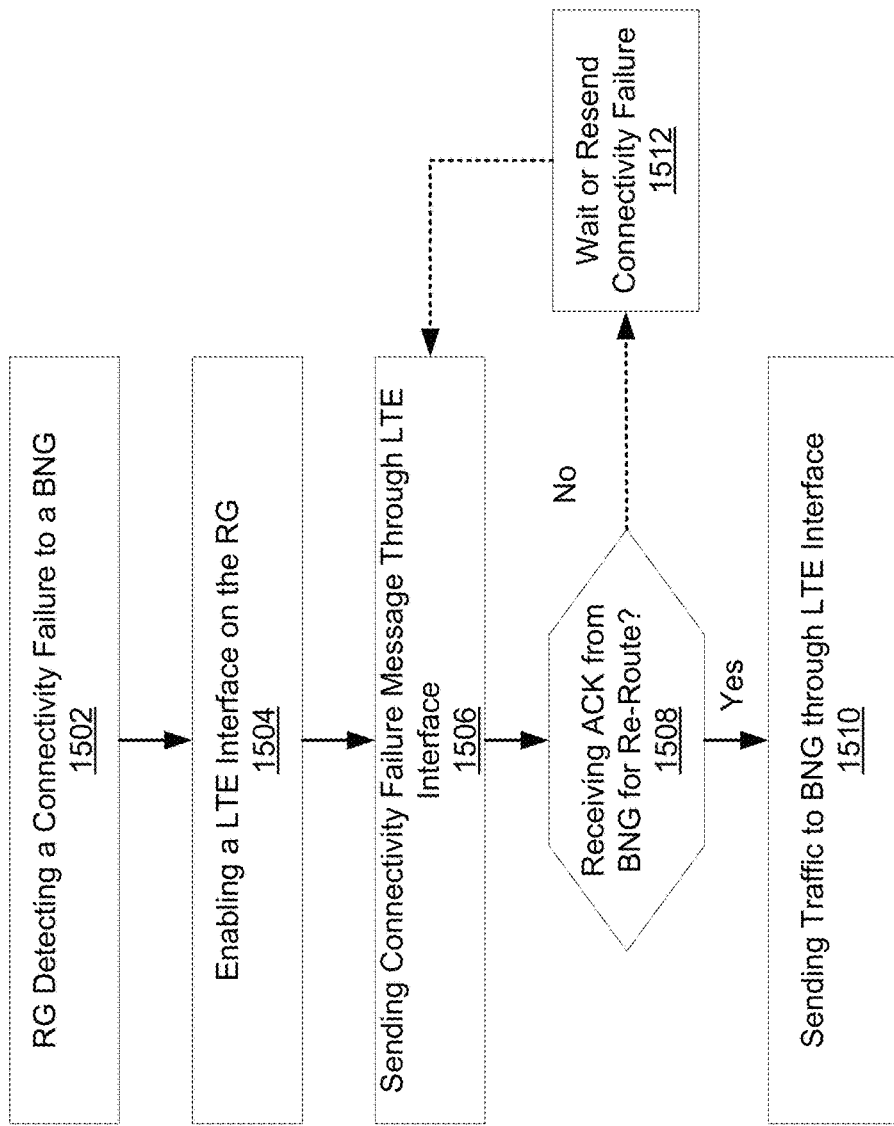
FIG. 15 is a flow diagram illustrating one embodiment of a traffic re-routing in a failure scenario at an RG.

FIGS. 7-8, 10, and 13 focus on the process flows on a BNG during connectivity failure and failure recovery, yet as illustrated in handshake diagrams FIGS. 6 and 9, an RG also is involved with the re-routing process. FIG. 15 is a flow diagram illustrating a traffic re-routing in a failure scenario that is executed by an RG. An RG detects a connectivity failure to its connecting BNG at block 1502. The RG can detect the connectivity failure by direct monitoring of the wireline connection, polling the BNG or link connectivity monitoring processes. Once the RG detects the failure, it enables an LTE interface on the RG at block 1504. As discussed herein above, the LTE interface on an RG can be pre-configured, but stays in sleeping mode during the RG's normal operation. With the enablement, the LTE interface becomes active. The RG sends a connectivity failure message (e.g., a PFD message) through the LTE interface at block 1506. Then the RG waits for a connectivity failure acknowledgment from its connecting BNG through its LTE interface at block 1508. If the RG receives the acknowledgement message, it starts to send traffic to the BNG through its LTE interface at block 1510. If the RG does not receive the acknowledgement message, the RG may operationally keep waiting or resend another connectivity failure message at block 1512.

Figure 16:
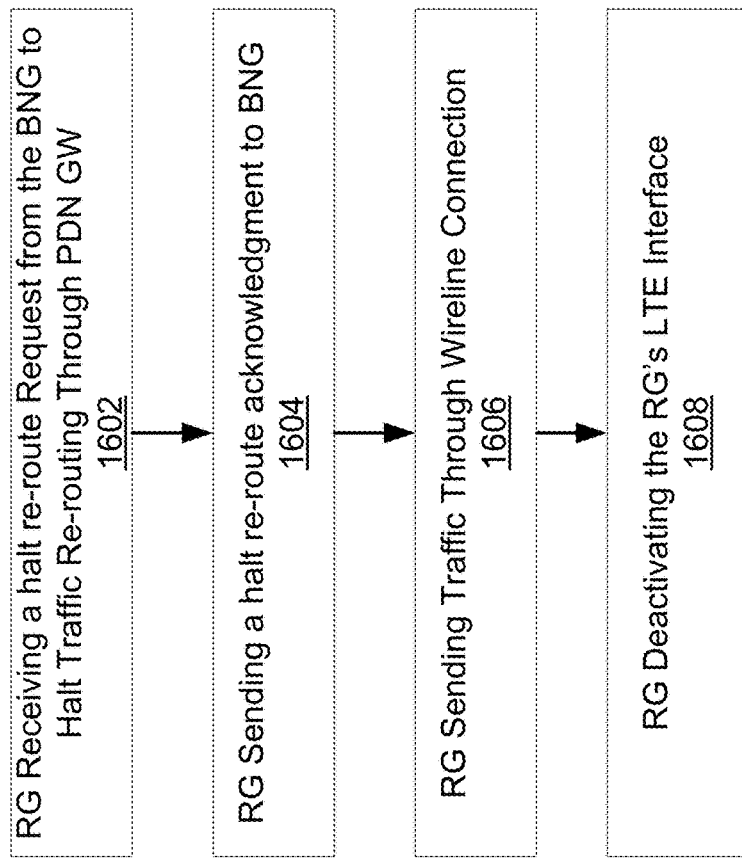
FIG. 16 is a flow diagram illustrating one embodiment of a traffic recovery process at an RG.

FIG. 16 is a flow diagram illustrating a traffic recovery process executed by an RG. As illustrated in FIG. 10, a BNG makes the decision on whether to restore traffic on a restored wireline between the BNG and its connecting RG. Once the BNG decides to restore traffic, it sends out a halt-re-route request to the RG. Thus on an RG, the restoration process starts with the RG receive a halt re-route request message from the connecting BNG at the wireline between the RG and the BNG to half traffic re-routing through a PDN GW at block 1602. Once the RG receives the request to halt re-routing, it sends out a halt re-route acknowledgment to the BNG at block 1604. Then the RG starts sending traffic through the connecting wireline between the RG and the BNG at block 1606. The RG completes the process by deactivating the RG's LTE interface at block 1608. Note the LTE interface goes back to sleep mode, but it keeps its IPv6 address in the LTE network.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network element serving as a first Broadband Network Gateway (BNG) of an Internet service provider to provide accessibility to a wide area network for a second network element serving as a first Residential Gateway (RG) upon a failure of a wireline connectivity between the first BNG and the first RG, the method comprising the steps of:
receiving a failure detect message indicating a connectivity failure at the first BNG from the first RG over a link other than the wireline connectivity between the first BNG and the first RG;
deciding whether to re-route traffic between the first BNG and the first RG;
sending a failure acknowledge message by the first BNG to the first RG notifying the first RG that re-routing has been initiated in response to the first BNG deciding to re-route;
sending a traffic re-route request message by the first BNG to a first Packet Data Network Gateway (PDN GW) of a Long-Term Evolution (LTE) network requesting the first PDN GW to re-route traffic between the first RG and the first BNG;
receiving a traffic re-route acknowledgement by the first BNG from the first PDN GW in response to the traffic re-route request message;and
re-routing traffic between the first RG and the first BNG through the first PDN GW by the first BNG.

2. The method of claim 1, wherein the first BNG decides to re-route in response to both the first BNG detecting a connectivity failure to the first RG and the first BNG receiving a failure detect message indicating a connectivity failure from the first RG.

3. The method of claim 1, further comprising:
sending a failure rejection message by the first BNG to the first RG requesting the first RG to wait in response to the first BNG deciding not to re-route.

4. The method of claim 1, wherein the re-routing of traffic between the first RG and the first BNG comprises the step of:
establishing a tunnel between the first RG and the first BNG that traverses the first PDN GW.

5. The method of claim 1, wherein the re-routing of traffic between the first RG and the first BNG comprises the steps of:
sending a reconfiguring ingress filter message to the first PDN GW to reconfigure an ingress filter of the first PDN GW;
receiving a reconfiguring ingress filter acknowledgment message from the first PDN GW;
sending a reconfiguring firewall message to the first PDN GW to reconfigure a firewall of the first PDN GW;
receiving a reconfiguring firewall acknowledgment message from the first PDN GW; and
sending traffic between the first RG and the first BNG that traverses the first PDN GW.

6. The method of claim 1, further comprising the steps of:
deciding by the first BNG that the wireline connectivity being restored between the first RG and the first BNG;
deciding by the first BNG whether to restore the wireline connection between the first RG and the first BNG;
sending a halt-re-route message by the first BNG through the wireline between the first BNG and the first RG requesting the first RG to halt the traffic re-routing;
receiving a halt-re-route acknowledgment from the first RG through the wireline between the first BNG and the first RG;
sending a session recovery message to the first PDN GW to stop forwarding traffic to the first RG;
receiving a session recovery acknowledgment from the first PDN GW; and
sending traffic by the first BNG to the first RG through the wireline between the first BNG and the first RG without going through the first PDN GW.

7. The method of claim 1, further comprising the steps of:
receiving an inquiry from the first BNG having a first device attached to the first RG by a second BNG that connects to an RG (a second RG) with a second device attached that exchanges traffic with the first device;
determining whether to re-route by the second BNG;
sending a re-route request message by the second BNG to the second PDN GW to request the second PDN GW to re-route traffic between the first PDN GW and the second BNG;
receiving a re-route acknowledgement from the second PDN GW by the second BNG; and
re-routing traffic between the second BNG and the first PDN GW through the second PDN GW by the second BNG.

8. The method of claim 7, wherein the re-routing of traffic between the first PDN GW and the second BNG comprises the step of:
establishing a tunnel between the first PDN GW and the second BNG that traverses the second PDN GW.

9. The method of claim 7, wherein the re-routing of traffic between the first PDN GW and the second BNG comprises the steps of:
sending a reconfiguring ingress filter message by the second BNG to the second PDN GW to reconfigure an ingress filter of the second PDN GW;
receiving by the second BNG a reconfiguring ingress filter acknowledgment message from the second PDN GW;
sending a reconfiguring firewall message by the second BNG to the second PDN GW to reconfigure a firewall of the second PDN GW;
receiving by the second BNG a reconfiguring firewall acknowledgment message from the first PDN GW; and
sending traffic between the first PDN GW and the second BNG that traverses The second PDN GW.

10. A method implemented by a network element serving as a Residential Gateway (RG) of an Internet service provider to provide accessibility to a wide area network for the RG upon failure of a wireline connectivity from the RG to a network element serving as a Broadband Network Gateway (BNG), the method implemented on the RG, comprising the steps of:
detecting a connectivity failure with the BNG that communicates with the RG;
enabling a Long-Term Evolution (LTE) interface on the RG ;
sending a connectivity failure message by the RG to the LTE interface through a Packet Data Network Gateway (PDN GW) to the BNG;
receiving a failure acknowledgement message from the BNG;
sending traffic to the BNG through the LTE interface on the RG
receiving a halt-re-route request from the BNG to halt a traffic re-route through the PDN GW by the RG;
sending a halt-re-route acknowledgment by the RG to the BNG through the wireline connection between the RG and the BNG;
sending traffic to the BNG through the wireline connection between the RG and the BNG; and
deactivating the LTE interface on the RG.

11. The method of claim 10, further comprising the step of:
resending the connectivity failure message by the RG after a pre-determined timeout interval in response to that the RG receives a failure rejection message from the BNG indicating that the BNG requests the RG to wait.

12. A network element serving as a first Broadband Network Gateway (BNG) of an Internet service provider to provide accessibility to a wide area network for a second network element serving as a first Residential Gateway (RG), the network element comprising:
    an uplink module to communicate with the wide area network;
    a wireline downlink module to communicate with the first RG;
    a Packet Data Network Gateway (PDN GW) interface module to communicate with a first PDN GW of a Long-Term Evolution (LTE) network;
    a network processor communicatively coupled to the uplink module, the wireline downlink module, and the PDN GW interface module, the network processor executing a re-route unit, the re-route unit including:
        a connectivity monitoring module configured to receive a failure detect message indicating a connectivity failure from the first RG;
        a re-route initiation module configured to decide whether to re-route traffic between the first BNG and the first RG;
        a protocol messaging module configured to send a failure acknowledge message to the first RG notifying the first RG that re-routing has been initiated in response to the first BNG deciding to re-route, the protocol messaging module sending a traffic re-route request message to the first PDN GW requesting the first PDN GW to re-route traffic between the first RG and the first BNG, and the protocol messaging module configured to receive a traffic re-route acknowledgement from the first PDN GW in response to the traffic re-route request message; and
        a tunneling/pass-through module configured to re-route traffic between the first RG and the first BNG through the first PDN GW.

13. The network element of claim 12, wherein the re-route initiation module is configured to decide to re-route in response to both the first BNG detecting a connectivity failure to the first RG and the first BNG receiving a failure detect message indicating a connectivity failure from the first RG.

14. The network element of claim 12, wherein the protocol messaging module is configured to send a failure rejection message to the first RG requesting the first RG to wait in response to the first BNG deciding not to re-route.

15. The network element of claim 12, wherein the tunneling/passthrough module is configured to establish a tunnel between the first RG and the first BNG that traverses the first PDN GW in order to re-route traffic between the first RG and the first BNG.

16. The network element of claim 12, wherein the tunneling/passthrough module is configured to send reconfiguring ingress filter message to the first PDN GW to reconfigure an ingress filter of the first PDN GW, the tunneling/passthrough module is configured to send reconfiguring firewall message to the first PDN GW to reconfigure a firewall of the first PDN GW in response to the protocol messaging module receiving a reconfiguring ingress filter acknowledgment message from the first PDN GW, and the tunneling/passthrough module is configured to send traffic between the first RG and the first BNG that traverses the first PDN GW in response to the protocol messaging module receiving a reconfiguring firewall acknowledgement message from the first PDN GW, and
    wherein the protocol messaging module is configured to receive a reconfiguring ingress filter acknowledgment message, and the protocol messaging module is configured to receive a reconfiguring firewall acknowledgment message.

17. The network element of claim 12, wherein the connectivity monitoring module is configured to decide that the wireline connectivity being restored between the first RG and the first BNG,
    wherein the re-route initiation module is configured to decide whether to restore the wireline connection between the first RG and the first BNG,
    wherein the protocol messaging module is configured to send a halt-re-route message through the wireline between the first BNG and the first RG to the first RG to halt the traffic re-routing, the protocol messaging module is configured to receive a halt-re-route acknowledgment from the first RG through the wireline between the first BNG and the first RG, and the protocol messaging module is configured to send a session recovery message to the first PDN GW to stop forwarding traffic to the first RG,
    wherein the tunneling/passthrough module is configured to halt re-routing traffic, and
    wherein the re-route unit is configured to route traffic through wireline between the first BNG and the first RG without going through the first PDN GW.

18. The network element of claim 12, wherein the connectivity monitoring module is configured to decide connectivity failure to a second BNG connecting to a second RG where the first BNG having a first device attached that exchanges traffic with a second device attached to the second RG,
    wherein the re-route initiation module is configured to determine whether to re-route,
    wherein the protocol messaging module is configured to send a re-route request message to the first PDN GW requesting the first PDN GW to re-route traffic between the second PDN GW and the first BNG, and the protocol messaging module (516) is configured to receive a re-route acknowledgement from the first PDN GW, and
    wherein the tunneling/passthrough module is configured to re-route traffic between the first BNG and the second PDN GW through the first PDN GW.

19. The network element of claim 12, wherein the tunneling/passthrough module is configured to establish a tunnel between the first BNG and the second PDN GW that traverses the first PDN GW in order to re-route traffic between the first BNG and the second PDN GW.

20. The network element of claim 12, wherein the tunneling/passthrough module is configured to send a reconfiguring ingress filter message to request the first PDN GW to reconfigure an ingress filter of the first PDN GW, the tunneling/passthrough module is configured to send a reconfiguring firewall message to the first PDN GW to reconfigure a firewall of the first PDN GW in response to the protocol messaging module receiving a reconfiguring ingress filter acknowledgment message from the first PDN GW, and the tunneling/passthrough module is configured to send traffic between the first BNG and the second PDN GW that traverses the first PDN GW in response to the protocol messaging module receiving a reconfiguring firewall acknowledgement message from the first PDN GW, and
    wherein the protocol messaging module is configured to receive a reconfiguring ingress filter acknowledgment message, and the protocol messaging module (516) is configured to receive a reconfiguring firewall acknowledgment message.

21. A network element serving as a Residential Gateway (RG) of an Internet service provider to provide accessibility to a wide area network for the RG to a second network element serving as a Broadband Network Gateway (BNG), the network element comprising:
- a wireline uplink module to communicate with the BNG;
- a Long-Term Evolution (LTE) interface module to communicate with a Packet Data Network Gateway (PDN GW) of an LTE network;
- a wireline downlink module to communicate to at least one device in a home network; and
- a network processor communicatively coupled to the wireline uplink module, the LTE interface module, and the wireline downlink module, the network processor executing a re-route unit,
  the re-route unit including,
    - a connectivity monitoring module configured to detect a connectivity failure with the BNG that communicates with the RG;
    - a protocol messaging module configured to send a connectivity failure message through the LTE interface module to the BNG, the protocol messaging module configured to receive a failure acknowledgement message from the BNG;
    - a re-route to LTE module configured to send traffic to the BNG through the LTE interface on the RG, wherein the protocol messaging module is configured to receive a halt-re-route request from the BNG to halt a traffic re-route through the PDN GW, and the protocol messaging module is configured to send a halt-re-route acknowledgment to the BNG through a wireline connection between the RG and the BNG, and wherein the re-route unit is configured to send traffic to the BNG through the wireline connection between the RG and the BNG, and the re-route unit is configured to deactivate the LTE interface module.

22. The network element of claim 21, wherein the protocol messaging module is configured to resend the connectivity failure message after a pre-determined timeout interval in response to the RG receiving a failure rejection message indicating that the BNG requests the RG to wait.

23. A method implemented by a Broadband Network Gateway (BNG) of an Internet service provider to provide accessibility to a wide area network for a Residential Gateway (RG) upon a failure of a wireline connectivity between the BNG and the RG, the method comprising the steps of:
- receiving a failure detect message indicating a connectivity failure at the BNG from the RG over a link other than the wireline connectivity between the BNG and the RG;
- deciding whether to re-route traffic between the BNG and the RG;
- sending a failure acknowledge message by the BNG to the RG notifying the RG that re-routing has been initiated in response to the BNG deciding to re-route;
- sending a traffic re-route request message by the BNG to a Packet Data Network Gateway (PDN GW) of a Long-Term Evolution (LTE) network requesting the PDN GW to re-route traffic between the RG and the BNG;
- receiving a traffic re-route acknowledgement by the BNG from the PDN GW in response to the traffic re-route request message; and
- re-routing traffic between the RG and the BNG through the PDN GW by the BNG.

24. A Broadband Network Gateway (BNG) of an Internet service provider to provide accessibility to a wide area network for a Residential Gateway (RG), the BNG comprising:
- an uplink module to communicate with the wide area network;
- a wireline downlink module to communicate with the RG;
- a Packet Data Network Gateway (PDN GW) interface module to communicate with a PDN GW of a Long-Term Evolution (LTE) network;
- a network processor communicatively coupled to the uplink module, the wireline downlink module, and the PDN GW interface module, the network processor executing a re-route unit,
  the re-route unit including:
    - a connectivity monitoring module configured to receive a failure detect message indicating a connectivity failure from the RG;
    - a re-route initiation module configured to decide whether to re-route traffic between the BNG and the RG;
    - a protocol messaging module configured to send a failure acknowledge message to the RG notifying the RG that re-routing has been initiated in response to the BNG deciding to re-route, the protocol messaging module sending a traffic re-route request message to the PDN GW requesting the PDN GW to re-route traffic between the RG and the BNG, and the protocol messaging module configured to receive a traffic re-route acknowledgement from the PDN GW in response to the traffic re-route request message; and
    - a tunneling/pass-through module configured to re-route traffic between the RG and the BNG through the PDN GW.

* * * * *

UNITED STATES PATENT AND TRADEMARK OFFICE
CERTIFICATE OF CORRECTION

PATENT NO. : 9,025,439 B2  
APPLICATION NO. : 13/533457  
DATED : May 5, 2015  
INVENTOR(S) : Haddad et al.

Page 1 of 1

It is certified that error appears in the above-identified patent and that said Letters Patent is hereby corrected as shown below:

In the Claims

In Column 13, Line 23, in Claim 1, delete "message;and" and insert -- message; and --, therefor.

In Column 14, Line 38, in Claim 9, delete "The" and insert -- the --, therefor.

In Column 14, Line 56, in Claim 10, delete "RG" and insert -- RG; --, therefor.

In Column 16, Line 37, in Claim 18, delete "(516) is" and insert -- is --, therefor.

In Column 16, Line 63, in Claim 20, delete "(516) is" and insert -- is --, therefor.

In Column 17, Line 12, in Claim 21, delete "module,the" and insert -- module, the --, therefor.

Signed and Sealed this  
Twelfth Day of July, 2016

Michelle K. Lee  
*Director of the United States Patent and Trademark Office*